(12) United States Patent
Zips et al.

(10) Patent No.: US 11,181,429 B2
(45) Date of Patent: Nov. 23, 2021

(54) MANOMETER WITH INJECTION MOLDED VOLUME REDUCTION ELEMENT

(71) Applicant: BAUMER BOURDON-HAENNI SA, Vendome (FR)

(72) Inventors: Alf Zips, Frankfurt (DE); Philippe Imhof, Bottighofen (CH); Zhixin Wang, Lawrenceville, GA (US)

(73) Assignee: BAUMER BOURDON-HAENNI SA, Vendome (FR)

( * ) Notice: Subject to any disclaimer, the term of this patent is extended or adjusted under 35 U.S.C. 154(b) by 0 days.

(21) Appl. No.: 16/936,464

(22) Filed: Jul. 23, 2020

(65) Prior Publication Data
US 2021/0025773 A1   Jan. 28, 2021

(30) Foreign Application Priority Data
Jul. 25, 2019  (DE) .................... 10 2019 120 107.1

(51) Int. Cl.
*G01L 7/04* (2006.01)
*G01L 7/00* (2006.01)

(52) U.S. Cl.
CPC .............. *G01L 7/043* (2013.01); *G01L 7/041* (2013.01)

(58) Field of Classification Search
CPC ... G01L 3/24; G01L 3/242; G01L 5/08; G01L 5/10; G01L 5/101; G01L 5/108; G01L 5/16; G01L 5/1627; G01L 5/167; G01L 5/22; G01L 5/28; G01L 23/085; G01L 23/20; G01L 5/0061; G01L 5/0071; G01L 5/008; G01L 5/06; G01L 5/171; G01L 7/106

USPC .................................................... 73/700–756
See application file for complete search history.

(56) References Cited

U.S. PATENT DOCUMENTS

| | | | | |
|---|---|---|---|---|
| 4,030,368 A | * | 6/1977 | Runge | ....................... G01L 7/16 73/744 |
| 2003/0101823 A1 | * | 6/2003 | McSheffrey | ............ G01L 7/041 73/732 |
| 2011/0303023 A1 | | 12/2011 | Becher et al. | |

(Continued)

FOREIGN PATENT DOCUMENTS

| | | |
|---|---|---|
| CH | 554 535 A | 9/1974 |
| DE | 1 816 508 U | 8/1960 |
| DE | 10 2016 115 197 A1 | 2/2018 |

(Continued)

*Primary Examiner* — Andre J Allen
(74) *Attorney, Agent, or Firm* — Norman B. Thot

(57) ABSTRACT

The invention relates to a pressure gauge for measuring the pressure of a fluid, the pressure gauge being designed for a pressure range with a maximum pressure, with: a housing with a housing wall which is filled with a filling fluid; a pressure connection located in the housing wall; a tubular spring located in the housing and connected to the pressure connection, whereby a fluid can flow through the pressure connection into the tubular spring, whereby the tubular spring is designed to expand in the direction of the housing wall when pressure is applied by the fluid, thereby mechanically acting on an indicator to indicate the pressure of the fluid; and at least one volume reduction element which is at least partially located in the housing between the tubular spring and the housing wall in the direction of expansion of the tubular spring, whereby the at least one volume reduction element is an injection-molded plastic part.

10 Claims, 4 Drawing Sheets

(56) References Cited

U.S. PATENT DOCUMENTS

2019/0204174 A1    7/2019   Sixtensson et al.

FOREIGN PATENT DOCUMENTS

| EP | 2 401 595 B1 |   | 5/2017 | | |
|----|--------------|---|--------|---|---|
| FR | 2985310 A3 | * | 7/2013 | ............. | G01L 7/043 |
| RU | 48222 U1 | * | 9/2005 | | |
| RU | 130701 U1 | * | 7/2013 | | |

* cited by examiner

MANOMETER WITH INJECTION MOLDED VOLUME REDUCTION ELEMENT

CROSS REFERENCE TO RELATED APPLICATIONS

This application claims the benefit of priority under 35 U.S.C. § 119 of German Application 102019120107.1 filed Jul. 25, 2019, the entire contents of which are incorporated herein by reference.

FIELD OF THE INVENTION

The invention relates to a pressure gauge (manometer) for measuring the pressure of a fluid.

BACKGROUND OF THE INVENTION

Mechanical pressure gauges that meet a certain safety standard, especially an S3 safety standard with blow-out rear walls, are frequently filled with a filling fluid such as oil, in particular glycerine or silicone. The oil filling may serve to suppress vibrations and pressure surges on the pointer mechanism. In the case of an oil filling, these pressure gauges must have a mechanism that compensates for the expansion of the oil volume as a function of temperature. This can be achieved with a flexible membrane which separates the oil-filled interior from the rigid rear wall and which encloses an air cushion in the space between to compensate for the expansion or compression of the oil.

This can be particularly advantageous in high-precision pressure gauges, as the internal pressure of the pressure gauge does not change and thus does not cause any measuring error. The complete filling of the interior of the pressure gauge can also provide better vibration protection.

Such a mechanical pressure gauge has a tubular spring, also called Bourdon spring or Bourdon tube, which indicates the pressure in a fluid by means of a deflection and a mechanical transmission. Filling these mechanical pressure gauges with the filling fluid is very time-consuming.

SUMMARY OF THE INVENTION

The purpose of this invention is to provide an advantageous and inexpensive concept for a pressure gauge, in particular for its manufacture.

The task is solved in accordance with a first aspect by means of a pressure gauge for measuring the pressure of a fluid, the pressure gauge being designed for a pressure range with a maximum pressure, the pressure gauge comprising a housing with a housing wall and a pressure connection located in the housing wall. The pressure gauge is filled with a filling fluid. Furthermore, the pressure gauge has a tubular spring which is located in the housing and which is connected to the pressure connection, whereby a fluid can be introduced into the tubular spring through the pressure connection. The tubular spring is designed to expand in the direction of the housing wall when pressure is applied by the fluid, thereby acting mechanically on an indicator to indicate the pressure of the fluid. The pressure gauge comprises at least one volume reduction element, which is located at least partially in the housing between the tubular spring and the housing wall in the expansion direction of the tubular spring. The volume reduction element is an injection-molded plastic part.

This structure has the technical advantage that a smaller filling quantity of fluid is required. Thanks to this limitation of the filling quantity of fluid, less filling fluid is required to fill the housing, which reduces manufacturing costs. This is particularly due to the fact that, on the one hand, less filling quantity is required and, on the other hand, the time required to fill the pressure gauge is reduced. This can lead to a reduction in the filling quantity of approx. 20% to 30%. In addition to the resulting lower costs, the weight of the pressure gauge is also advantageously reduced.

A further advantage is that the expansion of the tubular spring is limited by the volume reduction element when the maximum pressure in the tubular spring is exceeded. When the maximum pressure in the tubular spring is exceeded, the tubular spring bends less when the tubular spring strikes the hard polypropylene material of the volume reduction element. In this case, the bend angle of the tubular spring is flatter and leakage at the tubular spring can thus be avoided. Without the volume reduction element, the tubular spring would bend much more when the pressure is exceeded, which could lead to leakage at the tubular spring and thus to a pressure loss in the system.

In one embodiment, the volume reduction element is made of the material polypropylene (PP).

In the case of a cylindrical shape of the pressure gauge housing, the volume reduction element can be ring-shaped or designed as a ring segment, so that with a cylindrical pressure gauge housing it lies positively against the housing wall of the pressure gauge and thus optimally limits the volume of the filling fluid in the pressure gauge. Here, the volume reduction element is adapted to the contour of the housing wall.

In a further embodiment, the volume reduction element may also have a recess in which the tubular spring is located, in particular enclosing it on three sides. With this enlargement of the volume reduction element, the volume in the housing of a filling fluid to be filled is further reduced.

In one embodiment, the filling fluid with which the pressure gauge is filled is oil. The oil filling serves to suppress vibrations and pressure surges on the pointer mechanism and/or as damping for excessive pressure fluctuations in the tubular spring. This makes the pressure gauge display easier to read, as the mechanical display can be decoupled from vibrations, in particular vibrations in the resonance range of an unfilled pressure gauge. Alternatively, however, the filling fluid may also be glycerine or silicone.

When the pressure gauge is filled with oil, the oil can expand or contract when the temperature fluctuates. In this case, to avoid a pressure difference at the housing, the pressure gauge can have an air space, i.e. an air volume or air chamber, in the housing that can compensate for the change in volume of the oil. This reduces the influence of the oil on the tubular spring and thus on the indication of the pressure, and in particular it prevents it.

A membrane serves to compensate for the change in volume of the fluid. The membrane can be located in the housing and can separate a section which is filled with air from the fluid-filled section in the housing.

The volume reduction element preferably has a circular base from whose outer edge at least two ring segments protrude. The ring-shaped segments are preferably adapted to the structure of the housing wall of the pressure gauge so that they fit tightly against it. The volume reduction element is preferably designed as one piece together with the at least two ring segments. The material thickness of the circular base may be between 5 and 10 mm.

The volume reduction element within the pressure gauge is preferably attached to a process connection piece of the pressure gauge. The volume reduction element can be additionally or alternatively bonded or screwed to a side wall of the pressure gauge.

In addition, at least one further ring-shaped element may be provided in the center of the circular base of the volume reduction element, said element being designed to further limit and thus reduce the filling quantity of the filling fluid in the housing. Alternatively, a cylindrical or partially cylindrical element can be located in the center of the circular base of the volume reduction element. Further volume-reducing elements may also be provided as alternatives to or in addition to the centrally arranged volume-reducing elements, located adjacent to the at least two ring segments protruding from the outer edge of the circular base in the direction of the center of the circular base. These volume-reducing elements located laterally on the at least two ring segments may have a lower height compared to the at least two ring segments.

In the embodiment described above, at least one ring-shaped, cylindrical or partially cylindrical element is thus located in the center of the circular base of the volume reduction element.

This embodiment has the technical advantage that, in addition to the at least two ring segments protruding from the outer edge of the circular base of the volume reduction element, further elements reducing the inner volume of the pressure gauge are provided which protrude centrally from the circular base.

In a further embodiment, the volume reduction element may be designed as a hollow body, whereby a further reduction in the weight of the pressure gauge can be achieved.

Thanks to this limitation of the filling quantity, less filling fluid is advantageously required to fill the housing, which can reduce costs. The filling quantity that is limited is the maximum filling quantity that would have to be filled if the total volume of the volume reduction element were smaller or the volume reduction element were not fitted.

The mechanism and the tubular spring are located in the housing of the pressure gauge. The pressure connection can be arranged in a wall of the housing in such a way that the only opening in the housing is for the pressure connection. A recess in the volume reduction element is provided in the area of the opening of the housing. In the embodiment of the volume reduction element as two ring-shaped segments located on a circular base, the pressure connection runs between the ring-shaped segments. However, the volume reduction element may also alternatively be designed as a ring-shaped element which has an opening inside the ring for the pressure connection.

The pressure connection may have a hose connection or a pipe connection outside the housing to connect a suitable fluid line carrying the fluid whose pressure is to be measured. Inside the housing, the pressure connection is connected to the tubular spring in a pressure-tight manner so that the fluid can flow through the pressure connection into the tubular spring.

The housing of the pressure gauge may be made of plastic or metal, in particular stainless steel.

BRIEF DESCRIPTION OF THE DRAWINGS

Embodiments of the invention are shown in the drawings and are described in greater detail below.

They show:

FIG. 1b another schematic representation of the mechanical pressure gauge as shown in FIG. 1a;

FIG. 1c a perspective representation of the mechanical pressure gauge as shown in FIG. 1a;

DESCRIPTION OF THE PREFERRED EMBODIMENTS

Figure 1A:
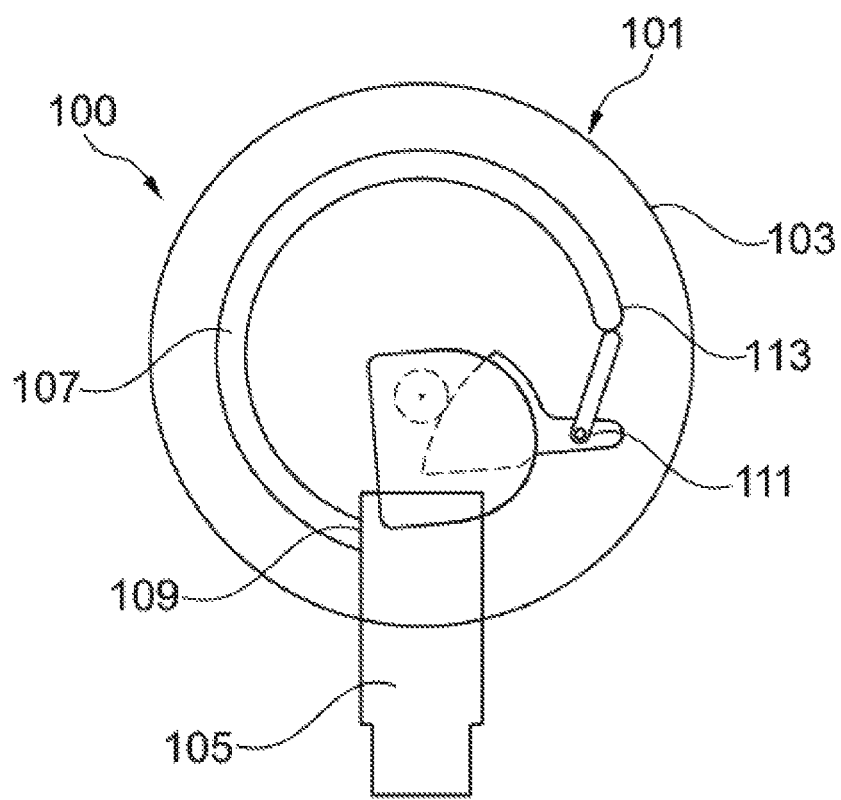
FIG. 1a a schematic representation of a conventional mechanical pressure gauge with a tubular spring.
Figure 1B:
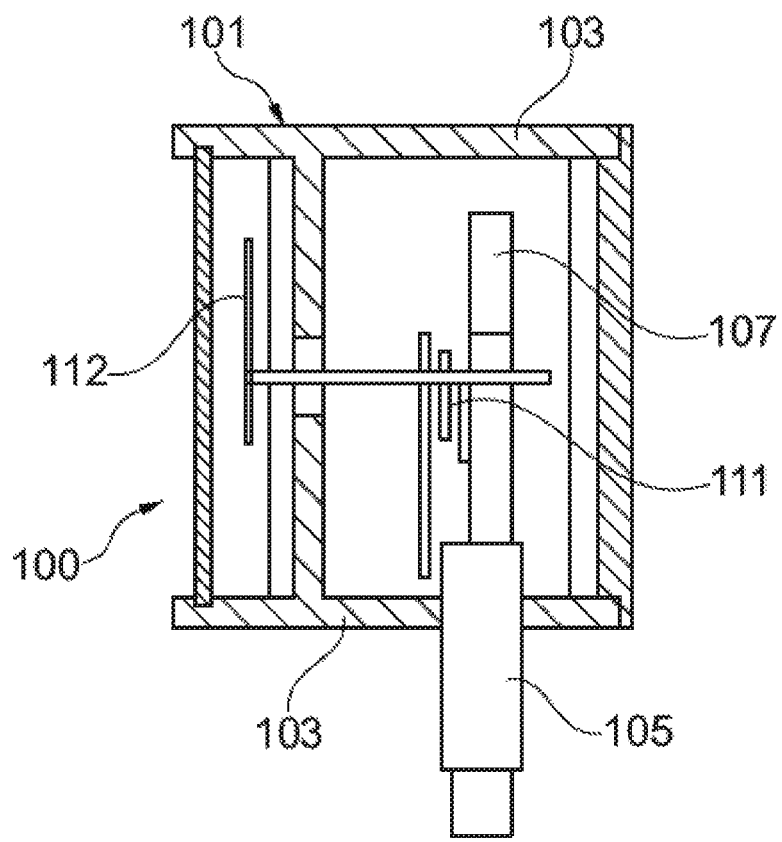
Figure 1C:
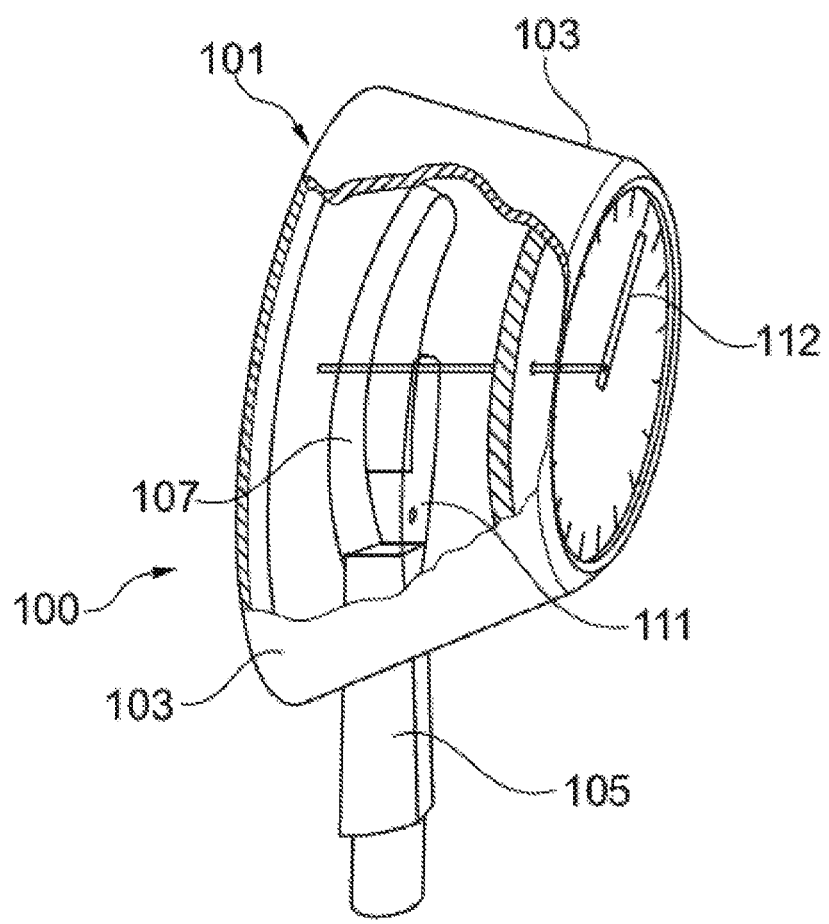

FIGS. 1a and 1b are schematic representations of a known mechanical pressure gauge 100. FIG. 1c is a perspective representation of the manometer 100 from FIGS. 1a and 1b.

The pressure gauge 100 has a housing 101 with a housing wall 103. The housing wall 103 represents a fluid-tight limitation of the pressure gauge 100 relative to an environment. The pressure gauge 100 has a pressure connection 105. The pressure connection 105 is located on the housing 101 and extends through the housing wall 103. A hose or pipe can be connected to a part of the pressure connection 105 located outside the housing 101 to introduce a pressure to be measured through the pressure connection 105 into the pressure gauge 100.

A tubular spring 107 is located in the pressure gauge 100. The tubular spring 107 is connected with an open end 109 to the pressure connection 105, so that the pressure is applied through the pressure connection 105 in the tubular spring 107. The tubular spring 107 and the pressure connection 105 form a closed system inside the housing 101. The tubular spring 107 is connected to a mechanism 111, in particular with a closed end 113. The mechanism 111 is designed to transmit a movement of the tubular spring 107 to a pointer 112.

The pressure gauge 100 is filled here with a filling fluid. The filling fluid is oil. The oil filling serves as damping for excessive pressure fluctuations in the tubular spring 107.

The tubular spring 107 is located in the housing 101 as a curved unit. The tubular spring 107 is subjected to the pressure to be measured. If the pressure of the fluid in the tubular spring 107 increases, the tubular spring 107 expands. The expansion follows the tendency of the tubular spring 107 to straighten and extends the tubular spring 107 in the direction of the housing wall 103. The higher the pressure, the further the tubular spring 107 is extended towards the housing wall 103.

Figure 2:
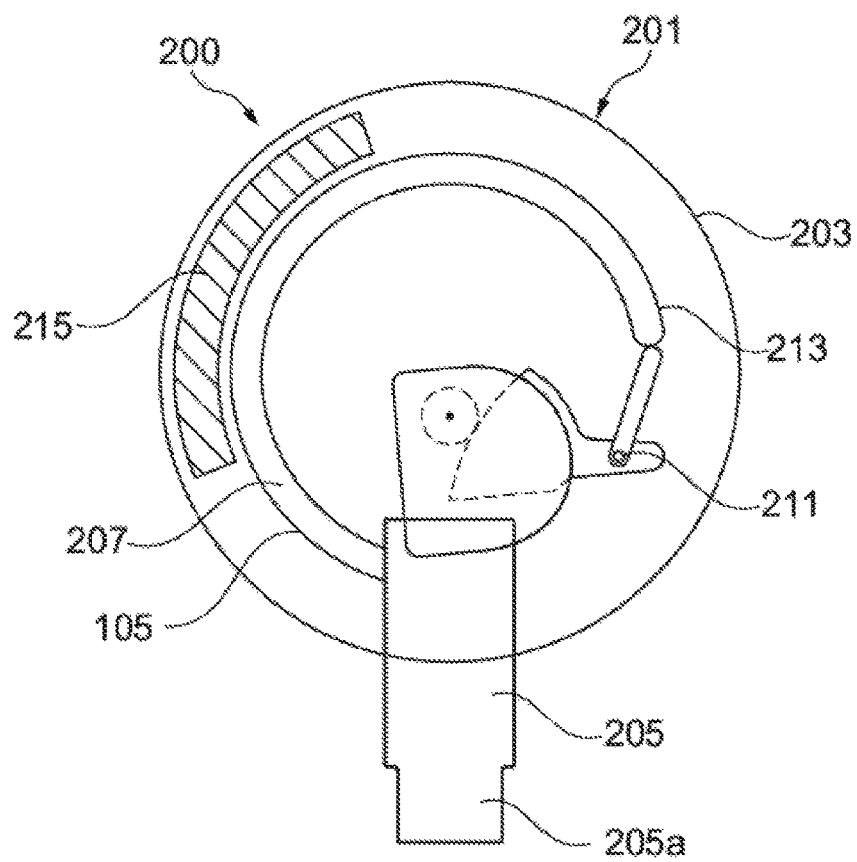
FIG. 2a schematic representation of a pressure gauge with a volume reduction element in accordance with one embodiment.

FIG. 2 shows a pressure gauge 200 as shown in one embodiment. The pressure gauge 200 has a housing 201 with a housing wall 203. The housing wall 203 represents a fluid-tight limitation of the pressure gauge 200 relative to an environment. The pressure gauge 200 has a pressure connection 205. The pressure connection 205 is located on the housing 201 and extends through the housing wall 203. A hose or pipe can be connected to a part 205a of the pressure connection 205 located outside the housing 201 to introduce a fluid whose pressure is to be measured through the pressure connection 205 into the pressure gauge 200.

A tubular spring 207 is located in the pressure gauge 200. The tubular spring 207 is tightly connected to the pressure connection 205 with an open end 209, so that the fluid can flow through the pressure connection 205 into the tubular spring 207. The tubular spring 207 and the pressure connection 205 form a pressure-closed system inside the housing 201. The tubular spring 207 is connected to a mechanism 211, in particular with a closed end 213. The mechanism 211 is designed to transmit a movement of the tubular spring 207 to a pointer (not shown). The tubular spring 207 is located in the housing 201 as a curved unit. If the pressure of the fluid in the tubular spring 207 increases, the tubular spring 207 expands. The expansion follows the tendency of the tubular spring 207 to straighten and extends the tubular spring 207 in the direction of the housing wall 203. The higher the pressure, the further the tubular spring 207 is extended towards the housing wall 203.

The pressure gauge 200 is filled with the filling fluid oil. The oil filling serves to suppress vibrations and pressure surges on the pointer 112 and/or as damping for excessive pressure fluctuations in the tubular spring 207.

A volume reduction element 215 is located in the housing 201 of the pressure gauge 200. The volume reduction element 215 in the form of a ring segment is located between the tubular spring 207 and the housing wall 203 in the expansion direction of the tubular spring 207. In its ring-shaped design, the volume reduction element 215 lies positively against the housing wall 203 of the pressure gauge 200 and thus optimally limits the volume of the filling fluid in the pressure gauge 200. Here, the volume reduction element 215 is adapted to the contour of the housing wall 203.

The volume reduction element 215 is an injection-molded plastic part. In the embodiment shown in FIG. 2, the material of the volume reduction element 215 is polypropylene (PP). Polypropylene is characterized by a hard material property.

The volume reduction element 215 is used to reduce the volume between the tubular spring 207 and the housing wall 203 so that a smaller filling quantity of oil is required inside the housing 201. This limitation of the filling quantity of filling fluid means that less oil is required to fill the housing 201, thus reducing manufacturing costs and at the same time also reducing the weight of the pressure gauge 200.

A further advantage is that the expansion of the tubular spring 207 is limited by the volume reduction element 215 when the maximum pressure in the tubular spring 207 is exceeded.

Without the volume reduction element 215, the tubular spring 207 would bend very much when the pressure is exceeded, which could lead to leakage at the tubular spring 207 and thus to a pressure loss in the system.

When the maximum pressure in the tubular spring 207 is exceeded, the tubular spring 207 bends less when the tubular spring 207 strikes the hard polypropylene material of the volume reduction element 215. In this case, the bend angle of the tubular spring 207 is flatter and leakage at the tubular spring 207 could advantageously be avoided.

In an embodiment of the volume reduction element 215 not shown here, it may have a recess into which the tubular spring 207 can be moved. In this version, the recess encloses the tubular spring 207 on three sides. An enlargement of the volume reduction element 215 can be achieved with this embodiment, so that a further volume of a filling fluid to be filled in the housing 201 can be reduced.

Figure 3:
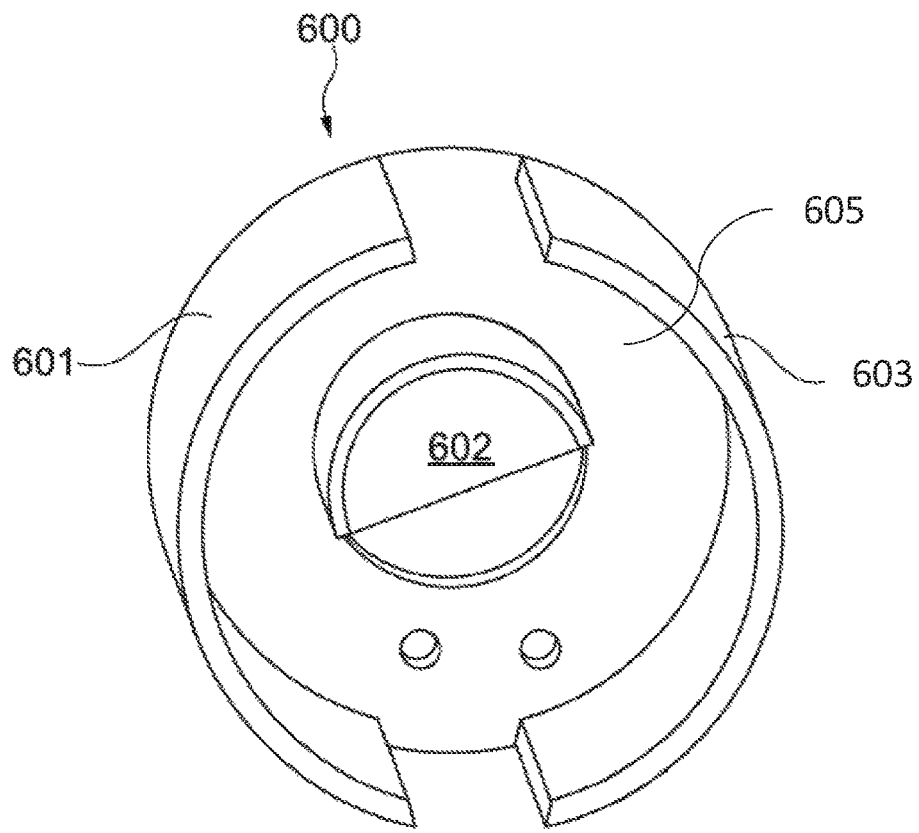
FIG. 3a schematic representation of a volume reduction element in accordance with one embodiment.

FIG. 3 shows a perspective and schematic representation of a volume reduction element 600 for a pressure gauge in accordance with an embodiment which may be provided for the pressure gauge 200 shown in FIG. 2, for example.

The volume reduction element 600 has a circular base 605 from whose outer edge two ring segments 601, 603 protrude. In the embodiment of the volume reduction element 600 shown here, the base 605 and the two ring segments 601, 603 are designed as one piece. Alternatively, the volume reduction element 600 can be designed as several pieces, whereby the base 605 can be connected to the two ring segments 601, 603 with a screwed or bonded connection.

The two ring segments 601, 603 are located on the base 605 in such a way that there are recesses at two points of the volume reduction element 600 to provide space for corresponding projections in the housing 201, or the pressure connection 205. When the volume reduction element 600 is installed, the ring segments 601 and 603, as parts of the volume reduction element 600, serve to reduce the free volume in the housing 201 and thus the required quantity of the filling fluid oil to be filled. At the same time, the ring segments 601 and 603 limit the tubular spring 207 during expansion in case of overpressure, thus preventing a defect in the pressure gauge 200 caused by bending of the tubular spring 207.

When the volume reduction element 600 is installed in the housing 201 of the pressure gauge 200, the ring segments 601 and 603 protrude from the circular base 605 into the interior of the housing 201.

In FIG. 3, a partially cylindrical element 602 is formed in the center of the circular base 605 of the volume reduction element 600, said element further reducing the free volume in a pressure gauge housing such as the housing 201 of the pressure gauge 200. When the volume reduction element 600 is installed in the housing 201 of the pressure gauge 200, the partially cylindrical element 602 projects into the interior and fills a previously free space in the housing 201, thus further reducing the volume of the pressure gauge 200 which has to be filled with the filling fluid. In this embodiment, the partially cylindrical element 602, the ring segments 601 and 603 as well as the circular base 605 are designed as one piece. Alternatively, the above-mentioned elements can also be designed as several pieces and assembled with a bonded or screwed connection to form the volume reduction element 600.

Figure 4:
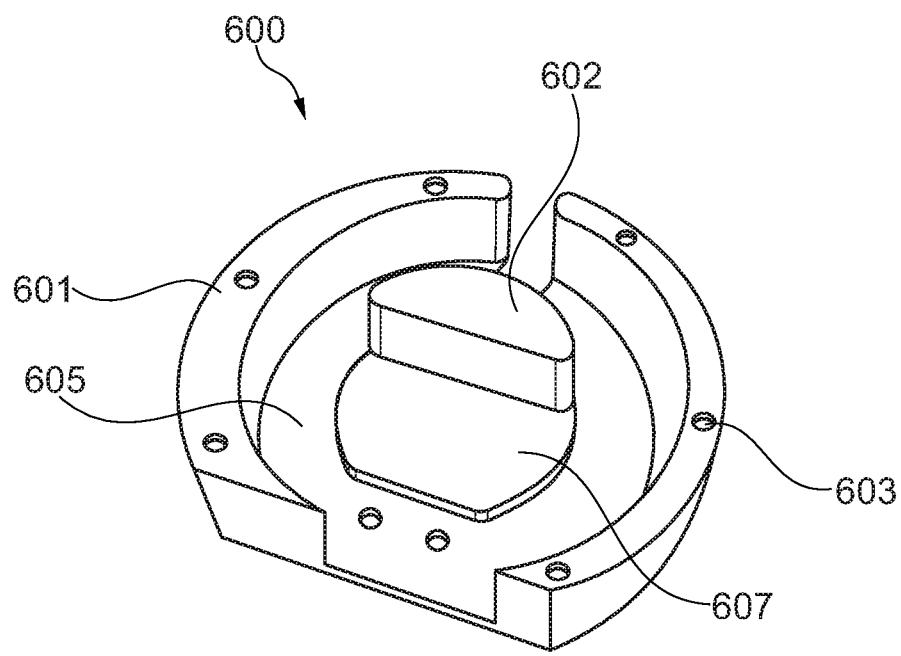
FIG. 4 a schematic representation of a volume reduction element in accordance with a further embodiment and FIG. 5 a schematic representation of a volume reduction element in accordance with a further embodiment.

FIG. 4 shows a perspective and schematic representation of a volume reduction element 600 for a pressure gauge in accordance with a further embodiment.

The volume reduction element 600 has a circular base 605 from whose outer edge two ring segments 601, 603 protrude, similar to the embodiment shown in FIG. 3. In the center of the circular base 605 of the volume reduction element 600, a first partially cylindrical element 602 is also formed, similar to the embodiment shown in FIG. 3, which again reduces the free volume in a pressure gauge housing such as the housing 201 of pressure gauge 200. Adjacent to the first partially cylindrical element 602, a second partially cylindrical element 607 is formed on the circular base 605.

When the volume reduction element 600 is installed in the housing 201 of the pressure gauge 200, the first partially cylindrical element 602 as well as the second partially cylindrical element 607 project into the interior and fill a previously free space in the housing 201, thus further reducing the volume of the pressure gauge 200 which has to be filled with the filling fluid. Adapted to the installation situation of the other elements of the pressure gauge 200 (FIG. 2), the first partially cylindrical element 602 projects further into the interior of the pressure gauge 200 when installed than the second partially cylindrical element 607. The first partially cylindrical element 602 thus has a reduced depth compared to the second partially cylindrical element 607.

In the embodiment of the volume reduction element 600 shown here, the base 605, the two ring segments 601, 603 and the first partially cylindrical element 602 as well as the second partially cylindrical element 607 are formed as one piece. Alternatively, the volume reduction element can be formed from more than one piece.

Figure 5:
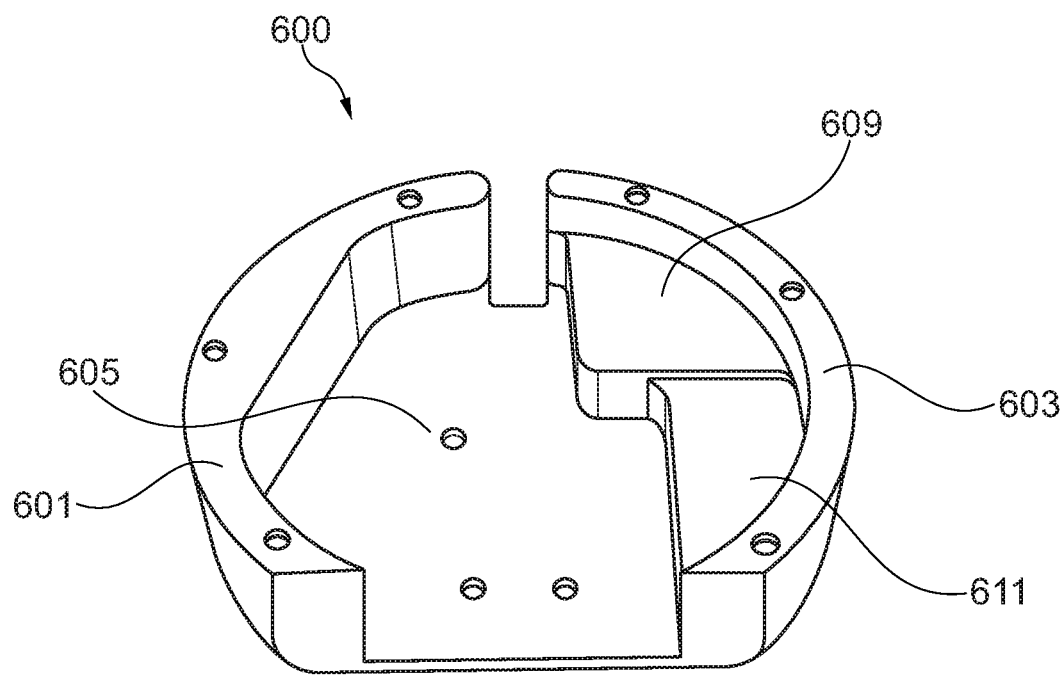

FIG. 5 shows a perspective and schematic representation of a volume reduction element 600 for a pressure gauge in accordance with a further embodiment.

The volume reduction element 600 has a circular base 605 from whose outer edge two ring segments 601, 603 protrude. The two ring segments 601, 603 are located on the base 605 in such a way that there are recesses at two points of the volume reduction element 600 to provide space for corresponding projections in the housing 201, or the pressure connection 205.

Laterally adjacent to the two ring segments 601, 603, in the direction of the center of the circular base 605, further lateral volume-reducing elements 609, 611 are formed on the circular base 605. A first lateral volume-reducing element 609 has a greater height compared to a second lateral volume-reducing element 611. Similar to the embodiment shown in FIG. 4, the first lateral volume-reducing element 609 projects further into the interior of the pressure gauge 200 when installed than the second lateral volume-reducing element 611. In this way, the design of the volume reduction element 600 matches the installation situation of the other elements of pressure gauge 200 (FIG. 2).

In this embodiment, the first and second volume-reducing elements 609 and 611, the ring segments 601 and 603 as well as the circular base 605 are designed as one piece. Alternatively, the above-mentioned elements can also be designed as several pieces and assembled with a bonded or screwed connection to form the volume reduction element 600.

What is claimed is:

1. Pressure gauge for measuring the pressure of a fluid, said pressure gauge being designed for a pressure range with a maximum pressure, with:
   one housing with a housing wall which is filled with a filling fluid;
   a pressure connection located in the housing wall;
   a tubular spring located in the housing and connected to the pressure connection, whereby a fluid can flow through the pressure connection into the tubular spring, the tubular spring being designed to expand in the direction of the housing wall when pressure is applied by the fluid, thereby mechanically acting on an indicator to indicate the pressure of the fluid; and
   at least one volume reduction element which is located in the housing at least partially between the tubular spring and the housing wall in the direction of expansion of the tubular spring, whereby the at least one volume reduction element is an injection-molded plastic part.

2. Pressure gauge in accordance with claim 1, whereby the material of the volume reduction element is polypropylene (PP).

3. Pressure gauge (200) in accordance with claim 1, whereby the volume reduction element is designed as at least one ring segment, or ring-shaped, and in particular is adapted to the contour of the housing wall.

4. Pressure gauge in accordance with claim 1, whereby the filling fluid is oil, in particular glycerine or silicone.

5. Pressure gauge in accordance with claim 1, whereby the pressure gauge comprises a membrane separating an air space from the filling fluid, said membrane being designed to provide volume compensation in response to a pressure variation of the filling fluid.

6. Pressure gauge in accordance with claim 1, whereby the volume reduction element has a circular base from the outer edge of which at least two ring segments protrude.

7. Pressure gauge in accordance with claim 6, whereby the material thickness of the circular base is between 5 and 10 mm.

8. Pressure gauge in accordance with claim 6, whereby the at least two ring segments are adapted to the structure of the housing wall of the pressure gauge so that these fit positively against the housing wall.

9. Pressure gauge in accordance with claim 6, whereby a ring-shaped, cylindrical or partially cylindrical element is formed in the center of the circular base.

10. Pressure gauge in accordance with claim 1, whereby the volume reduction element is designed as a hollow body.

* * * * *